US009541233B2

(12) United States Patent
Papania et al.

(10) Patent No.: US 9,541,233 B2
(45) Date of Patent: Jan. 10, 2017

(54) ERGONOMIC HOLDER AND METHOD FOR HANDHELD SUPPORT OF A TABLET COMPUTER

(71) Applicant: Hand in Glove Innovations, LLC, Mason, OH (US)

(72) Inventors: Diana Papania, Mason, OH (US); David Parrott, Cincinnati, OH (US)

(73) Assignee: HAND IN GLOVE INNOVATIONS, LLC, Mason, OH (US)

( * ) Notice: Subject to any disclaimer, the term of this patent is extended or adjusted under 35 U.S.C. 154(b) by 0 days.

(21) Appl. No.: 14/570,332

(22) Filed: Dec. 15, 2014

(65) Prior Publication Data

US 2015/0169000 A1    Jun. 18, 2015

Related U.S. Application Data

(60) Provisional application No. 61/916,218, filed on Dec. 15, 2013.

(51) Int. Cl.
| G06F 1/16 | (2006.01) |
| F16M 13/04 | (2006.01) |
| F16M 11/04 | (2006.01) |
| F16M 11/10 | (2006.01) |
| F16M 13/00 | (2006.01) |

(52) U.S. Cl.
CPC ............ *F16M 13/04* (2013.01); *F16M 11/041* (2013.01); *F16M 11/10* (2013.01); *F16M 13/00* (2013.01); *F16M 2200/08* (2013.01)

(58) Field of Classification Search
CPC ........... A45C 11/00; A45F 5/00; F16M 13/04; F16M 13/00; F16M 11/10; F16M 11/041; F16M 2200/08; G06F 1/1626; G06F 1/1622; G06F 1/16

USPC .............. 361/679.3, 670.41–679.44, 679.55, 361/679.56, 679.57, 679.58; 206/307, 206/316.1, 320, 701; 224/101, 197, 217, 224/218, 219, 930; 248/121–125.9, 248/127–188.91, 917–923; 294/25, 137, 294/142, 167; 312/223.1, 223.2
See application file for complete search history.

(56) References Cited

U.S. PATENT DOCUMENTS

| 5,228,610 | A | | 7/1993 | Spence |
| 5,996,956 | A | * | 12/1999 | Shawver ............... G06F 1/1626 248/309.1 |
| 6,184,804 | B1 | * | 2/2001 | Harrison ................. G06F 1/163 341/20 |
| 6,726,070 | B2 | | 4/2004 | Lautner |
| 7,334,711 | B1 | | 2/2008 | Winters |
| 7,748,634 | B1 | | 7/2010 | Zehr et al. |
| 8,120,896 | B2 | | 2/2012 | Mori et al. |
| 8,136,785 | B1 | | 3/2012 | Polster |
| 8,281,924 | B2 | * | 10/2012 | Westrup ................... A45C 3/02 206/320 |
| 8,382,059 | B2 | | 2/2013 | Le Gette et al. |

(Continued)

*Primary Examiner* — Courtney Smith
*Assistant Examiner* — Sagar Shrestha
(74) *Attorney, Agent, or Firm* — Frost Brown Todd LLC

(57) ABSTRACT

An ergonomic holder and method of supporting a tablet computer by hand includes a base and a handle. The base is configured to operatively connect to the tablet computer for supporting the tablet computer thereon. The handle projects from the base. The handle also at least partially defines a forefinger sleeve and at least partially defines a thumb sleeve for receiving a forefinger and a thumb of the hand. The forefinger sleeve projects relative to the thumb sleeve such that the forefinger sleeve and the thumb sleeve intersect at a predetermined gripping angle for supporting the tablet computer in a plurality of hand positions.

24 Claims, 9 Drawing Sheets

(56) References Cited

U.S. PATENT DOCUMENTS

| | | | |
|---|---|---|---|
| 8,424,829 B2 | 4/2013 | Lu et al. | |
| 8,480,144 B2 | 7/2013 | Potter et al. | |
| 8,528,798 B2* | 9/2013 | Chen | A45C 3/001 |
| | | | 224/217 |
| 8,550,317 B2 | 10/2013 | Hyseni | |
| 8,668,122 B2 | 3/2014 | Case et al. | |
| 8,770,403 B2* | 7/2014 | Kuo | A45C 11/00 |
| | | | 150/154 |
| 8,833,820 B1* | 9/2014 | Hill | F16M 13/04 |
| | | | 224/218 |
| 2002/0047028 A1 | 4/2002 | Harada et al. | |
| 2003/0213822 A1* | 11/2003 | Lautner | A44C 5/0007 |
| | | | 224/221 |
| 2004/0226973 A1 | 11/2004 | Kao | |
| 2012/0019016 A1 | 1/2012 | Brisbin | |
| 2012/0024918 A1 | 2/2012 | DeCamp et al. | |
| 2012/0075799 A1 | 3/2012 | Pollex | |
| 2012/0091312 A1 | 4/2012 | Baker | |
| 2012/0104059 A1 | 5/2012 | Yen | |
| 2012/0104185 A1* | 5/2012 | Carroll | F16M 11/041 |
| | | | 248/27.1 |
| 2012/0305445 A1 | 12/2012 | Hu | |
| 2012/0319414 A1* | 12/2012 | Potter | G06F 1/1628 |
| | | | 294/25 |
| 2013/0043693 A1 | 2/2013 | Chen et al. | |
| 2013/0069381 A1* | 3/2013 | Sakamoto | A45F 5/10 |
| | | | 294/142 |
| 2013/0140837 A1 | 6/2013 | Carroll | |
| 2013/0161967 A1 | 6/2013 | Jarrett et al. | |
| 2013/0206942 A1* | 8/2013 | Trotsky | F16M 11/041 |
| | | | 248/274.1 |
| 2013/0240579 A1 | 9/2013 | Yu | |
| 2013/0295549 A1 | 11/2013 | Hills | |
| 2013/0300141 A1 | 11/2013 | Byrne | |
| 2014/0077515 A1 | 3/2014 | Rasmussen et al. | |
| 2014/0151417 A1* | 6/2014 | Gayler | G06F 1/1628 |
| | | | 224/217 |
| 2014/0249943 A1* | 9/2014 | Hicks | G06Q 20/204 |
| | | | 705/17 |
| 2015/0009610 A1* | 1/2015 | London | G06F 1/163 |
| | | | 361/679.03 |

* cited by examiner

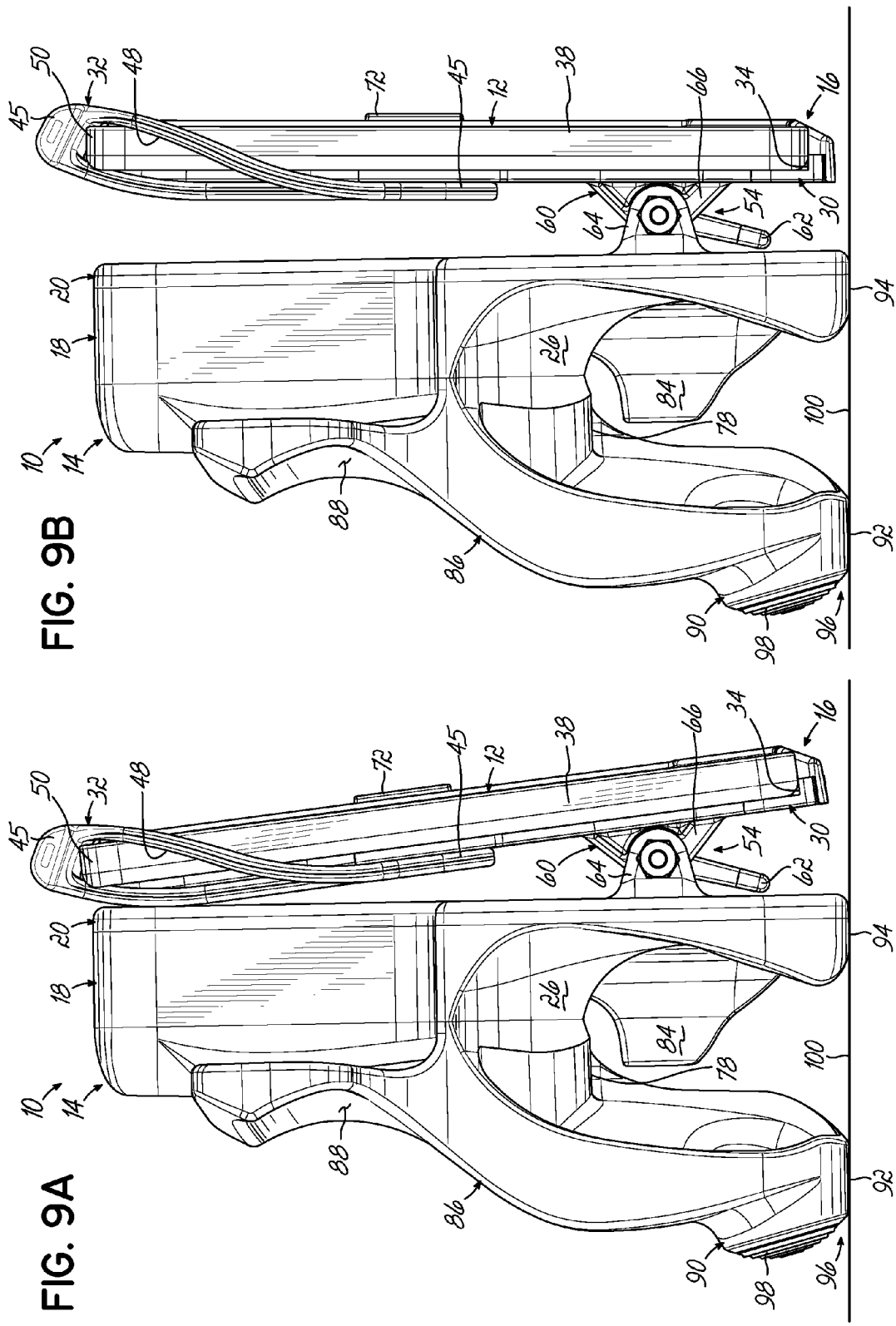

ND METHOD FOR
ERGONOMIC HOLDER AND METHOD FOR HANDHELD SUPPORT OF A TABLET COMPUTER

CROSS-REFERENCE TO RELATED APPLICATION

This application claims priority to application Ser. No. 61/916,218 filed on Dec. 15, 2013 entitled "Ergonomic Tablet Holder", the disclosure of which is hereby expressly incorporated by reference herein, in its entirety.

TECHNICAL FIELD

The present invention relates generally to an ergonomic holder and method for use with a hand of a user, and more particularly, to an ergonomic holder and method for handheld support of a tablet computer.

BACKGROUND

In recent years, the marketplace has seen a proliferation of handheld electronic tablet computers, such as smartphones, ebook readers, personal digital assistants, and slates. As compared to traditional computers, tablet computers tend to be relatively lightweight, compact, battery-powered, and mobile in order to provide a user with the benefits of a computer in essentially any environment. By way of example, the user may conveniently carry and operate the device while working from an indoor office or outdoor setting, watching videos in a reclining chair, or even reading electronic books from the comfort of the user's bed.

The convenience of tablet computers has resulted in a rapid expansion of new developments. Indeed, many users often have their tablet computer in hand for relatively prolonged periods of time each day. As such, many tablet computers require being held and supported by one hand of the user, while the other hand of the user interacts with a user interface of the tablet computer. Although convenient for relatively short periods of time, using tablet computers for these prolonged periods can cause muscle fatigue within the hand supporting the tablet computer. This muscle fatigue further fatigues the user's wrist, arm, neck, and head and often leads to poor posture, muscle strains, and general discomfort and pain throughout the user's body. User fatigue may also lead to dropping and/or damaging the tablet computer. For example, one user may carry the tablet computer at his or her side while walking, whereas another user may hold the tablet computer above his or her head while reading in bed. In turn, the user's grip on the tablet computer may easily fail while walking or sleeping in one or more positions and possibly damage the tablet computer.

Moreover, to at least some extent, the risk of user fatigue increases as tablet computer manufacturers decrease the size of tablet computers, while also increasing the amount of hardware therein. In other words, tablet computers may be decreasing in size, but they are increasing in density. As a result, tablet computers are becoming smaller than may be comfortably held by the user.

One object of the present invention is to reduce muscle fatigue for a person using a tablet computer while also decreasing the user's likelihood of dropping the tablet computer during use.

SUMMARY

The present invention achieves the above-stated objective with an inventive ergonomic holder that includes a base and a handle, wherein the base is configured to operatively connect and support the tablet computer and the handle projects from the base and at least partially defines a forefinger sleeve and at least partially defines a thumb sleeve. The forefinger sleeve is configured to receive a forefinger of a hand, whereas the thumb sleeve is configured to receive a thumb of the hand. The forefinger sleeve projects relative to the thumb sleeve such that the forefinger sleeve and the thumb sleeve intersect at a predetermined gripping angle for ergonomically supporting the tablet computer in a plurality of hand positions.

According to one preferred embodiment of the invention, the ergonomic holder includes a finger support projecting from the handle and further defines the thumb sleeve. Thereby, the finger support is configured to receive a remaining plurality of fingers of the hand such that the remaining plurality of fingers and the forefinger and the thumb simultaneously grip the finger support and the handle for further ergonomically support the tablet computer.

In another aspect of the exemplary embodiment, the ergonomic holder includes a hand brace and/or a forefinger brace. The hand brace projects from the base proximate to the forefinger sleeve and is configured to engage another portion of the hand. The forefinger brace projects from the handle such that the handle and the forefinger brace surround the forefinger sleeve to define a ring. The ring is configured to receive the forefinger. As such, the hand brace and/or the forefinger brace are each configured to further ergonomically support the tablet computer in the plurality of hand positions.

A method of supporting a tablet computer by a hand with an ergonomic holder includes inserting the forefinger into the forefinger sleeve of the handle and engaging the handle with the forefinger. The method also includes inserting a thumb into the thumb sleeve of the handle and engaging the handle with the thumb. Furthermore, the method includes positioning the forefinger relative to the thumb at the predetermined angle such that the forefinger and the thumb define a generally "L" shape. Thereby, the method includes supporting the ergonomic holder and the tablet computer on the forefinger and the thumb of the hand, simultaneously.

Various additional objectives, advantages, and features of the invention will be appreciated from a review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below serve to explain the invention.

FIG. 9A is a left side view of the ergonomic holder and the tablet computer of FIG. 1 in a rearward position.

FIG. 9B is a left side view of the ergonomic holder and the tablet computer of FIG. 1 in an upright position.

DETAILED DESCRIPTION

Figure 1:
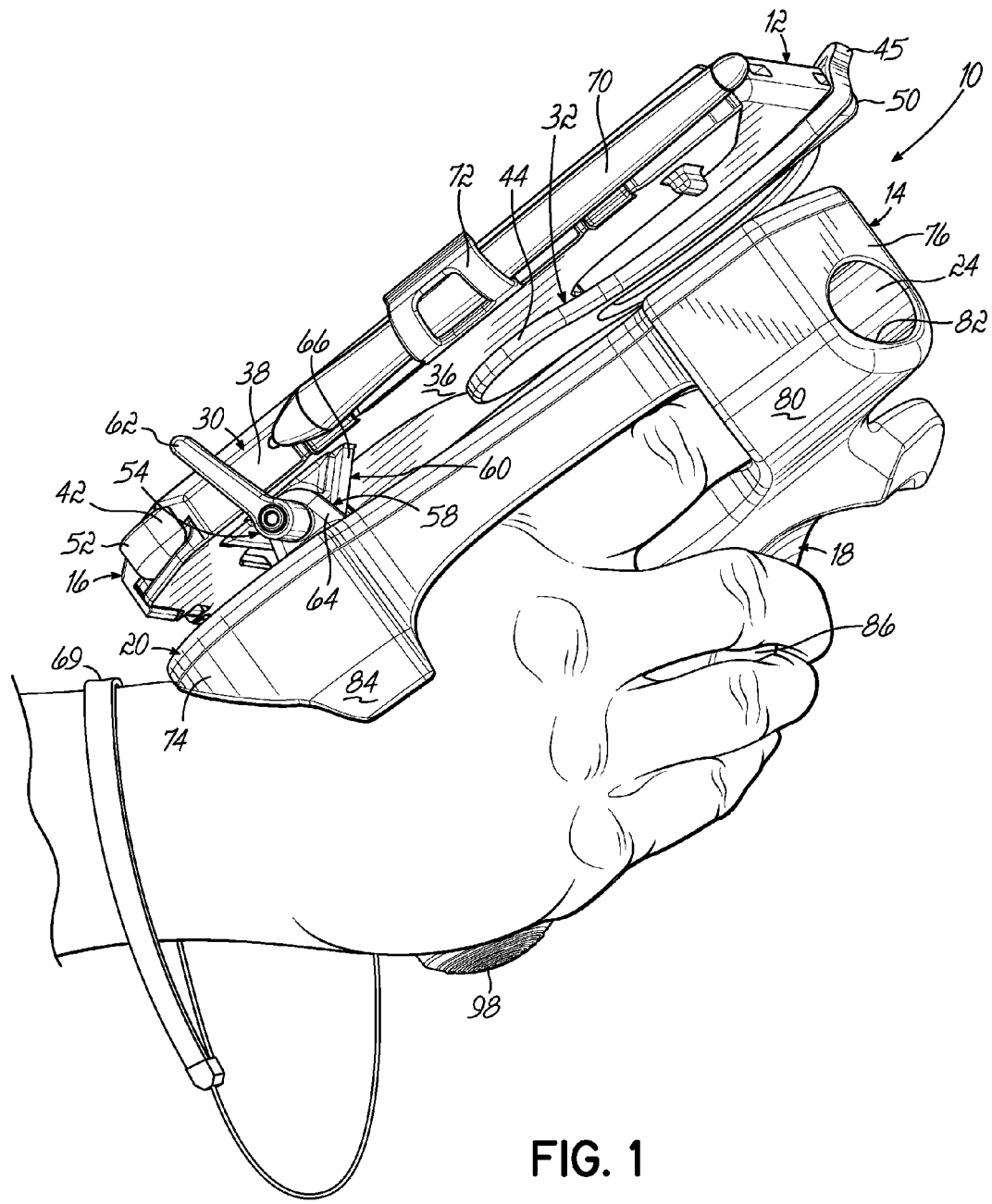
FIG. 1 is a right side perspective view of an embodiment of an ergonomic holder supporting a tablet computer by hand.
Figure 2:
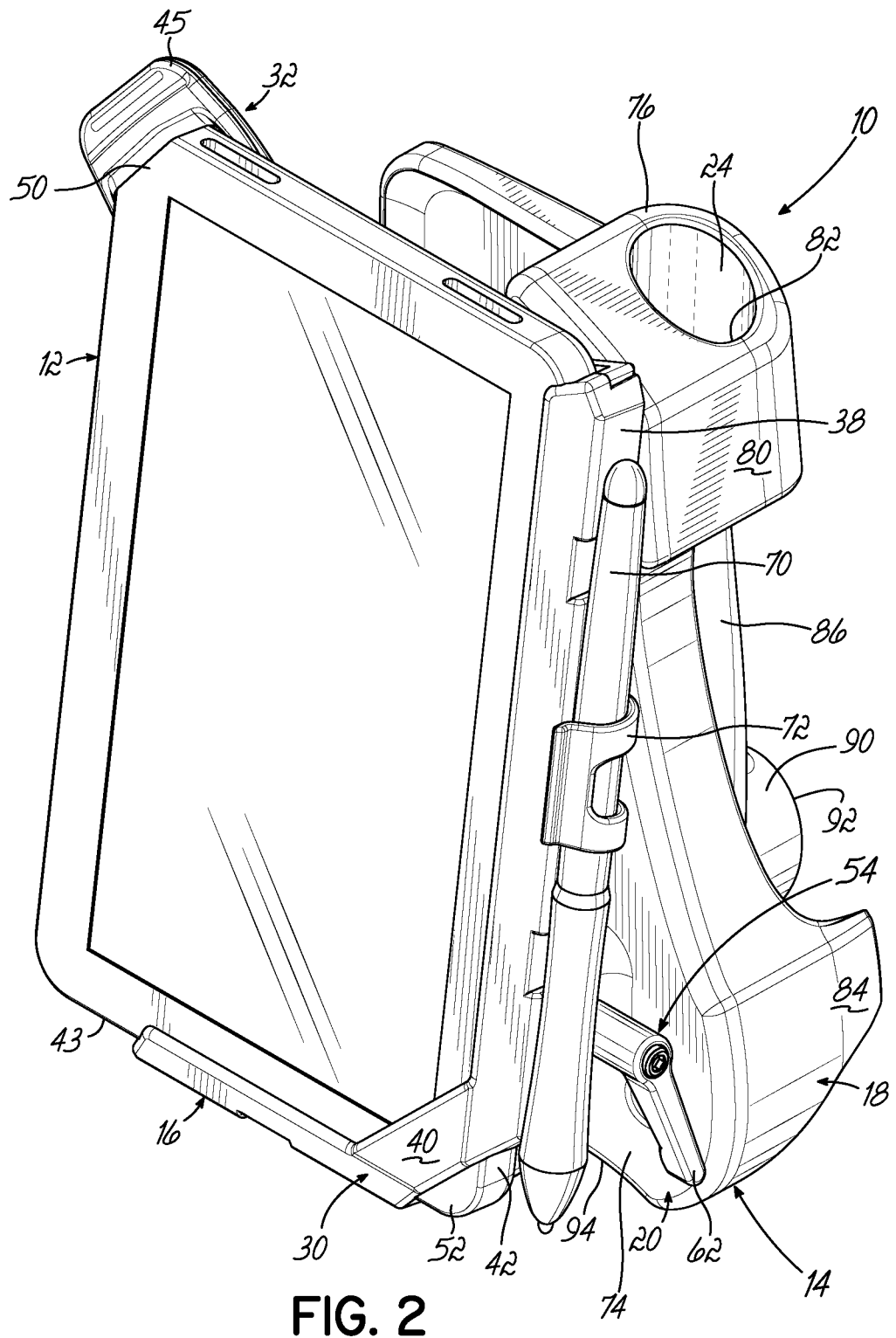
FIG. 2 is a front perspective view of the ergonomic holder and the tablet computer of FIG. 1.
Figure 3:
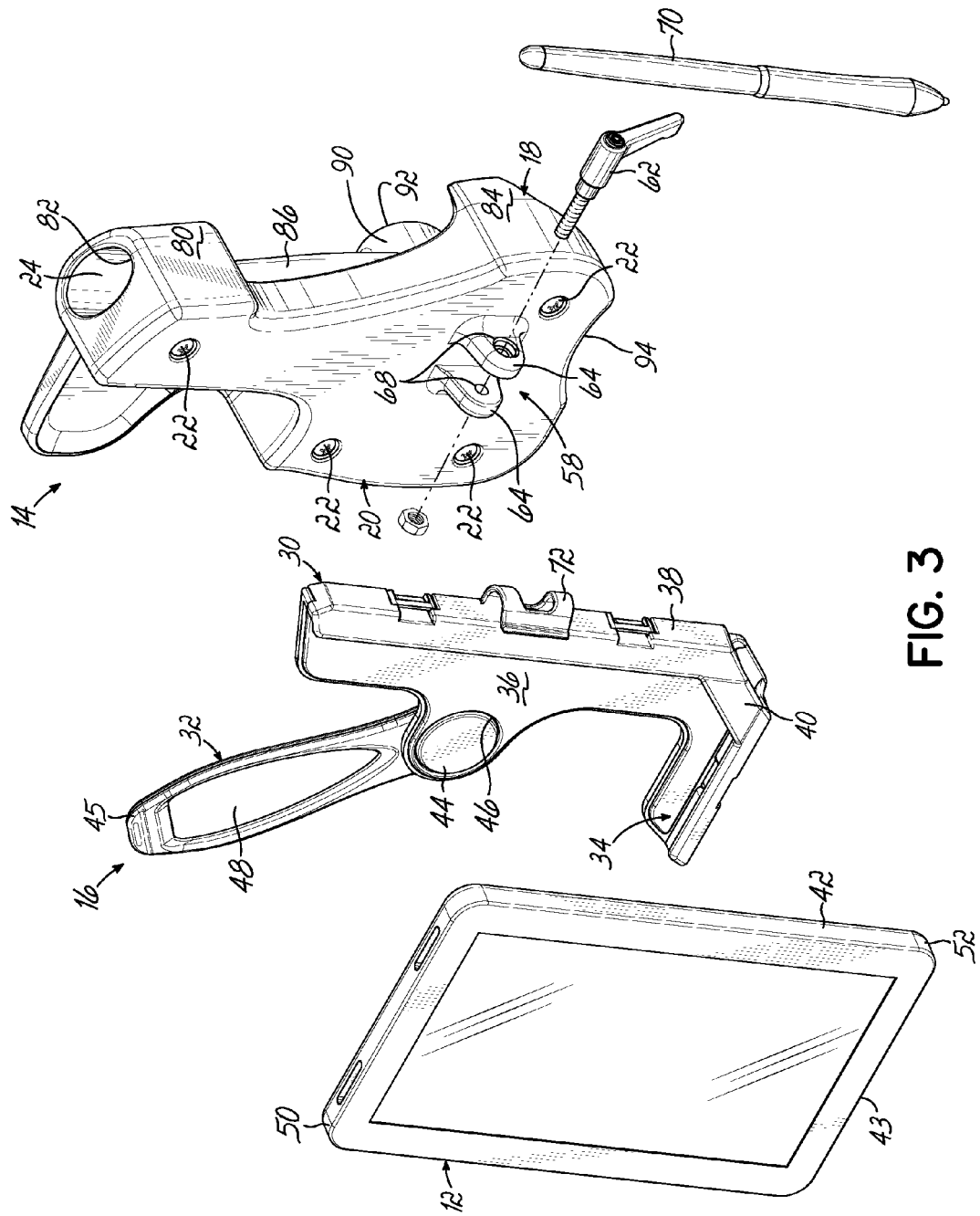
FIG. 3 is an exploded, front perspective view of the ergonomic holder and the tablet computer of FIG. 1.
Figure 7:
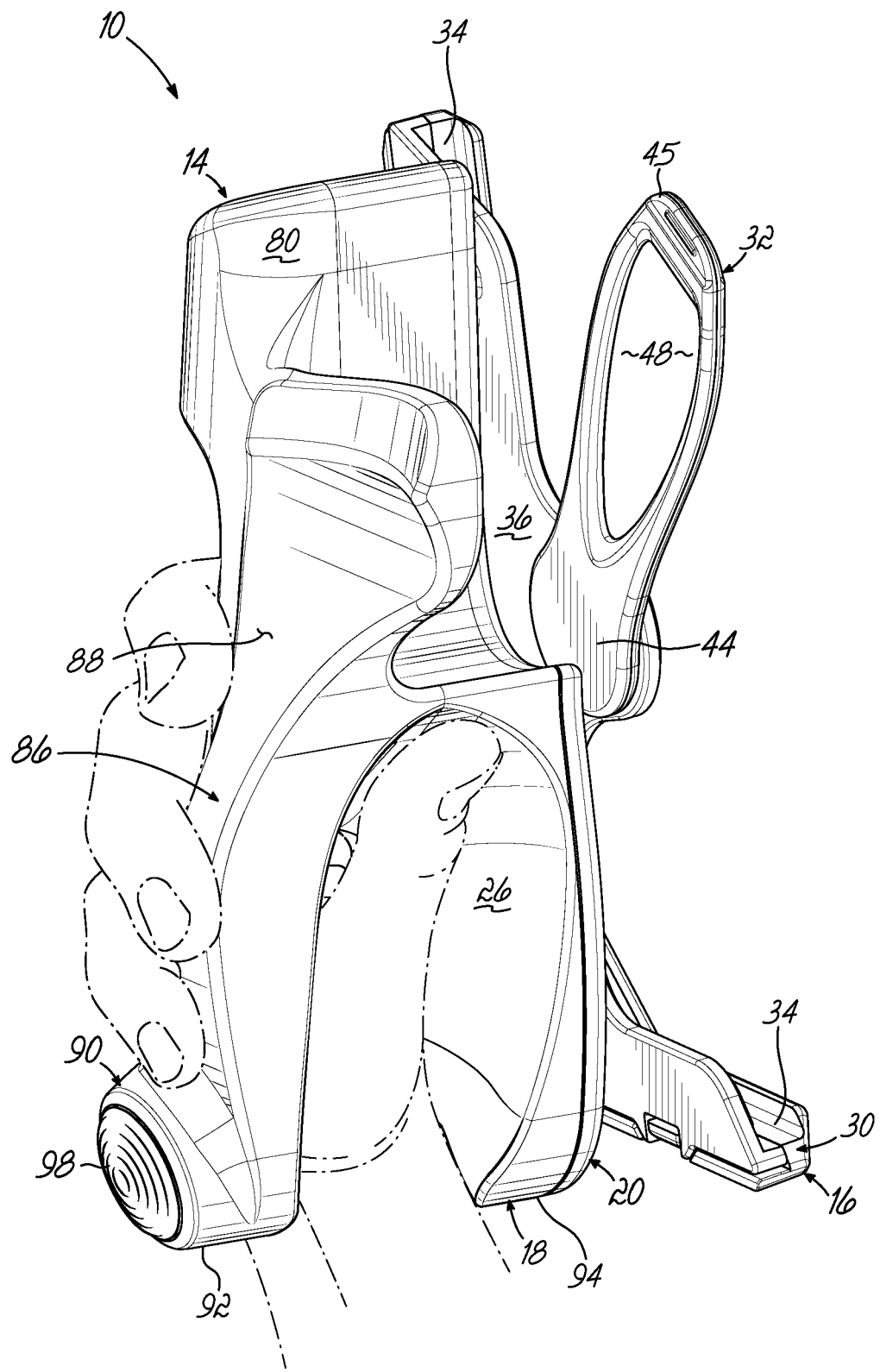
FIG. 7 is the left rear perspective view of the ergonomic holder of FIG. 6.

With reference to FIGS. 1-3, an embodiment of an ergonomic holder 10 for supporting a tablet computer 12 by hand includes a holder assembly 14 for receiving a user's hand and a frame 16 for removably securing the tablet computer 12 to the ergonomic holder 10. The holder assembly 14 includes a handle 18 attached to a base 20 via a plurality of fasteners 22. The frame 16 is pivotably connected to the base 20 for operatively connecting the tablet computer 12 to the handle 18 and supporting the tablet computer 12 thereon. The handle 18 projects from the base 20 and at least partially defines a forefinger sleeve 24 and at least partially defines a thumb sleeve 26 (See FIG. 7). The forefinger sleeve 24 projects relative to the thumb sleeve 26 such that the forefinger sleeve 24 and the thumb sleeve 26 intersect at a predetermined gripping angle θ (See FIG. 8). The user inserts a forefinger and a thumb within the forefinger sleeve 24 and the thumb sleeve 26, respectively. Thereby, the forefinger and the thumb engage the handle 18 in a generally "L" shape to simultaneously and ergonomically distribute a weight of the ergonomic holder 10 and the tablet computer 12 to the forefinger and the thumb. As disclosed herein, the term "sleeve" generally refers to an elongated channel sized to receive a thumb or a finger thereagainst. The term "sleeve" may thus refer to the elongated channel having concave sidewalls that are at least partially open, as shown in FIGS. 1-3, or that are closed. As such, the term "sleeve" is not intended to limit the invention to having any particular number of openings so long as the sleeve defines at least a portion of an elongated channel. In addition, the ergonomic holder 10 shown and described herein is fitted for a right hand of the user. It will be appreciated that the ergonomic holder 10 may be mirrored in order to fit a left hand of the user. In turn, the term "generally 'L' shape" refers to a generally "L" shape formed with the left hand and a mirrored generally "L" shape formed with the right hand. Thus, the invention described herein is not intended to be limited to any particular hand.

The frame 16 includes a bracket mount 30 configured to receive a portion of the tablet computer 12 and removably secure the tablet computer 12 therein. More particularly, the frame 16 includes a band 32 that engages the tablet computer 12 and, in turn, holds the tablet computer 12 within a groove 34. According to the exemplary embodiment, the bracket mount 30 includes a rear wall 36, a sidewall 38, and a front wall 40 that collectively define the groove 34 with a U-shaped cross-section such that the bracket mount 30 is generally L-shaped. The L-shape and the U-shape generally are sized to slidably and snugly receive a side 42 and a bottom 43 of the tablet computer 12. The front wall 40 is sized to allow for full access to the user interface. However, it will be appreciated that one or more of the front wall 40, the sidewall 38, and the rear wall 36 may alternatively include one or more access holes in order to accommodate the user interface of another type of tablet computer.

The band 32 is a resilient band 32 rotatably mounted to the rear wall 36 of the bracket mount 30. The band 32 has a connected end portion 44 and an opposing grip end portion 45. The connected end portion 44 is received within an annular hole 46 extending through the rear wall 36 such that the band 32 may rotate generally parallel with the rear wall 36. The band 32 further defines an opening 48 extending between the connected end portion 44 and the grip end portion 45. The band 32 is rotatably positioned to extend toward a corner 50 of the tablet computer 12 opposite a corner 52 of the tablet computer 12 received within the bracket mount 30. The grip end portion 45 resiliently stretches around the corner 50 such that the corner 50 is received within the opening 48. Thereby, the bracket mount 30 and the band 32 capture the tablet computer 12 within the groove 34 for removably securing the tablet computer 12 to the frame 16.

According to the exemplary embodiment, the ergonomic holder 10 also includes a latch 54 configured to removably connect the frame 16 to the base 20 and position the frame 16 relative to the base 20 at a selectable viewing angle. The latch 54 includes a base coupling 58, a frame coupling 60, and a latch fastener 62. The base coupling 58 includes a pair of offset tabs 64 projecting from the base 20 toward the rear wall 36, whereas the frame coupling 62 includes another tab 66 projecting from the rear wall 36 toward the base 20. The tab 66 is received between the offset tabs 64 in order to align segments of a bore 68 for inserting the latch fastener 62 therein. The latch fastener 62 may be selectively tightened or loosened in order affix the position of the frame 16 relative to the base 20 and adjust the position of the frame 16 relative to the base 20, respectively. According to an alternative embodiment, the tablet computer 12 and/or a case for the tablet computer 12 may include one or more portions of the latch 54 in order to secure the tablet computer 12 to the base 20 with or without the frame 16. The ergonomic holder 10 may also include a wrist strap 69 operatively connected thereto for wrapping about the user's hand, wrist, and/or arm for securing the ergonomic holder 10 to the user. According to yet another alternative embodiment, one or more portions of the frame 16 may be directly attached to the base 20 for mounting the tablet computer 12 directly to the base 20. For example, the bracket mount 30 may be formed with the base 20 or rigidly attached to the base 20 for supporting the tablet computer 20 thereon.

Furthermore, the ergonomic holder 10 shown in FIGS. 1-3 includes a writing utensil 70, which may be tethered to another portion of the ergonomic holder 10 by a string (not shown) connected therebetween. The sidewall 38 of the bracket mount 30 includes a resiliently mounted clip 72 projecting therefrom for removably capturing the writing utensil 70 against the sidewall 38 of the frame 16. However, it will be appreciated that the clip 72 may be positioned on any portion of the ergonomic holder 10 from which the user may access and retrieve the writing utensil 70. It will be further appreciated that the writing utensil 70 may be any device configured for interacting with a screen or other portion of the tablet computer 12.

Figure 4:
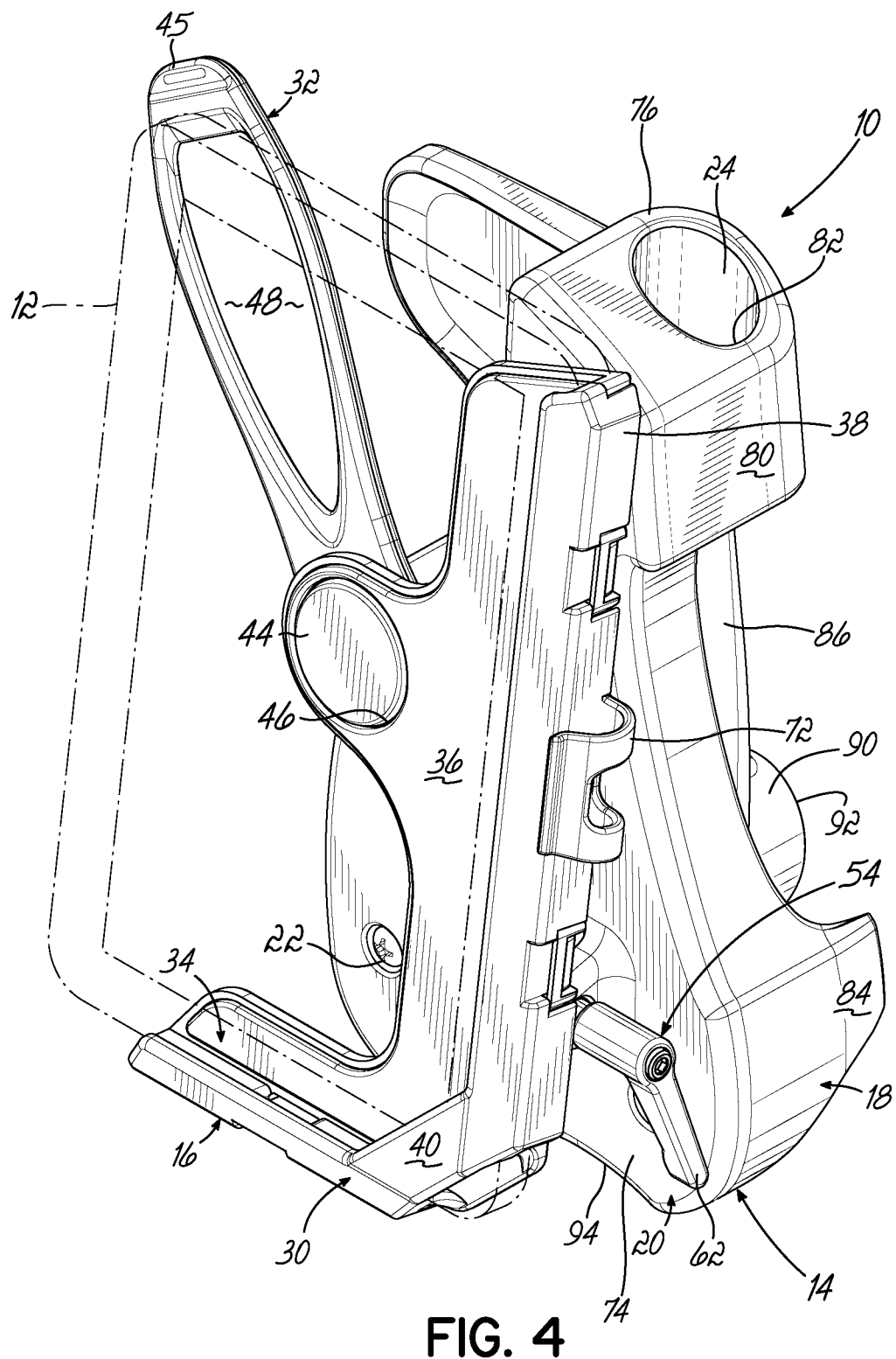
FIG. 4 is a front perspective view of the ergonomic holder of FIG. 1.
Figure 5:
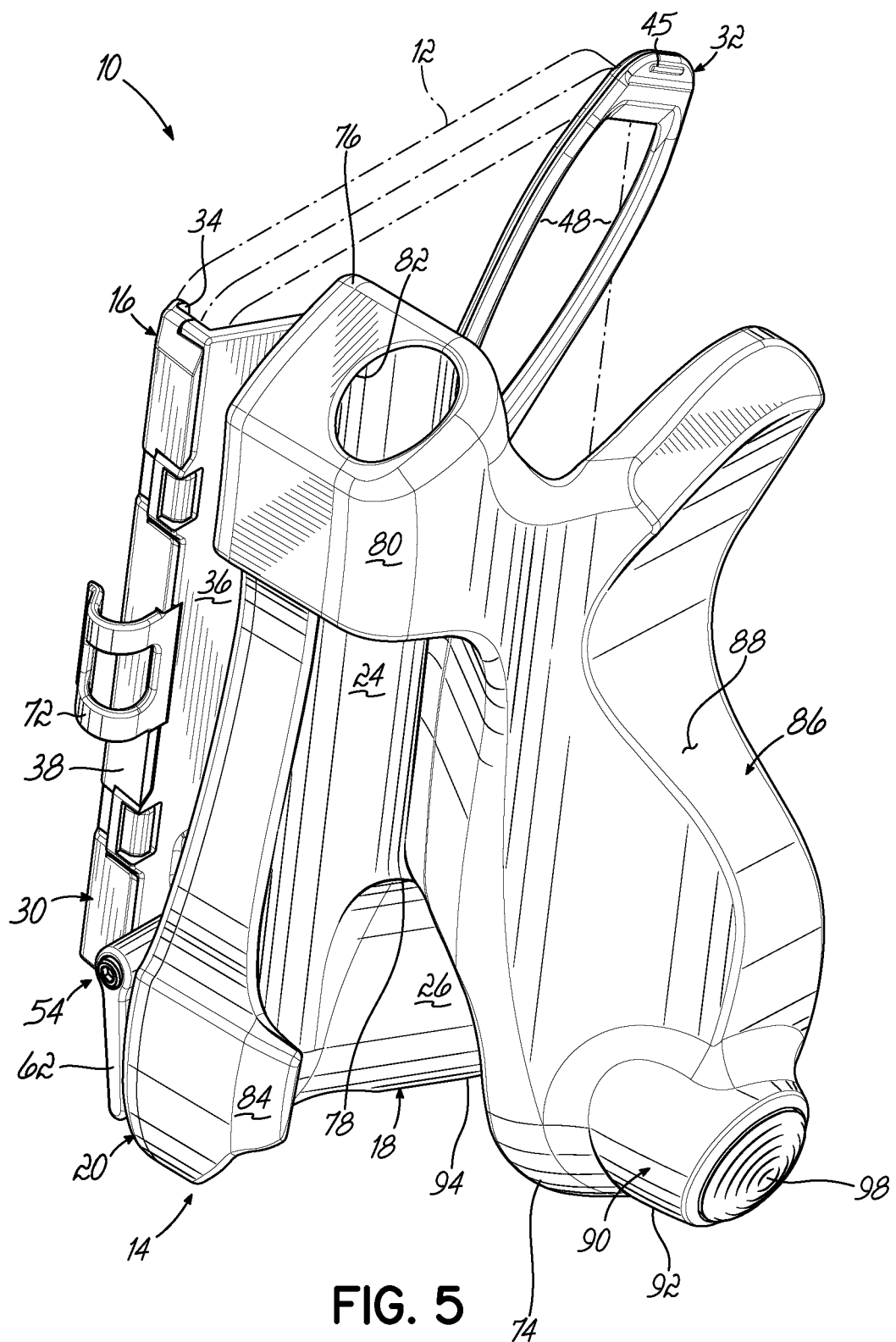
FIG. 5 is a right rear perspective view of the ergonomic holder of FIG. 1.
Figure 6:
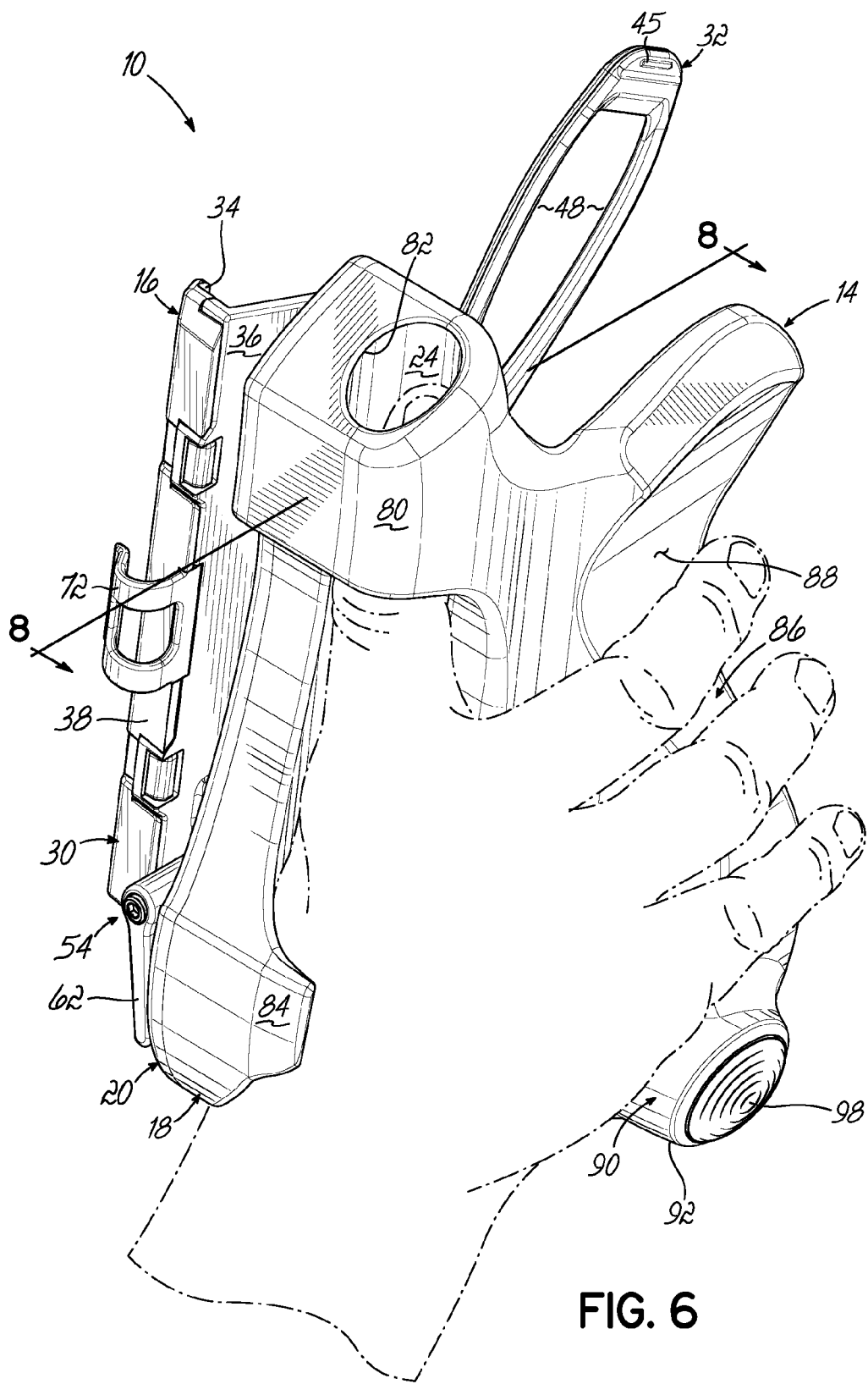
FIG. 6 is the right rear perspective view of the ergonomic holder of FIG. 5 having a right hand of a user inserted therein.

FIGS. 4-5 show the ergonomic holder 10 and, more particularly, the intersection of the forefinger sleeve 24 and the thumb sleeve 26 in greater detail. Generally, the ergonomic holder 10 includes a proximal end portion 74 configured to be proximate to a wrist of the user and a distal end portion 76 configured to be proximate to an end of the forefinger of the user and away from the wrist. As described herein, the terms "proximal" and "distal" are intended to provide relative positions along a length of the ergonomic holder 10 whereas the term "lateral" is intended to provide a relative position along a width of the ergonomic holder 10. As such, the terms "distal", "proximal", and "lateral" are not intended to limit the invention described herein. The forefinger sleeve 24 and the thumb sleeve 26 intersect generally within the proximal end portion 74. From the intersection, the forefinger sleeve 24 projects distally and, according to the exemplary embodiment, generally parallel with the sidewall 38 of the frame 16. In contrast, the thumb sleeve 26 projects distally and laterally at the predetermined angle as discussed below in greater detail. Therefore, the forefinger sleeve 24 and the thumb sleeve 26 are further defined by a medial contour 78, which may also be referred to as a "web" 78 for comfortably engaging the portion of the hand between the thumb and the forefinger. Similarly, the handle 18 includes generally arcuate and smooth surfaces along each of the forefinger and thumb sleeves 24, 26 for further comfortably engaging the forefinger and thumb, respectively.

According to the exemplary embodiment, the ergonomic holder 10 includes a forefinger brace 80 projecting from the distal end portion 76 of the handle 18 about the forefinger sleeve 24. The forefinger brace 80 and the handle 18 collectively define a ring 82 configured to receive the forefinger of the user. The ergonomic holder 10 has one ring 82 surrounding an end portion of the forefinger sleeve 24 generally transverse to the forefinger sleeve 24. However, it will be appreciated that additional rings may be added to surround additional portions of the forefinger sleeve 24 and/or thumb sleeve 26.

The ergonomic holder 10 further includes a hand brace 84 projecting from the proximal end portion 74 of the base 20 for engaging another portion of the user's hand for further support of the tablet computer 12. More particularly, the hand brace 84 projects away from the base 20 in a position proximally located from the intersection of the forefinger and thumb sleeves 24, 26. Thereby, the hand brace 84 is configured to engage and cup a portion of the hand positioned proximally from the thumb. According to the exemplary embodiment, the hand brace 84 is configured to engage a portion of the hand between the thumb and the wrist. Alternatively or in addition to the hand itself, the hand brace 84 may further extend toward and engage the wrist and/or portions of the arm according to another embodiment for further support of the tablet computer 12.

As shown and discussed above, the ergonomic holder 10 and the tablet computer 12 may be supported by the forefinger, the thumb, and the portion of the hand proximal from the thumb via the forefinger sleeve 24, the ring 82, the thumb sleeve 26, and the hand brace 84. In addition, the ergonomic holder 10 includes a finger support 86 to further support the tablet computer 12 with a plurality of remaining fingers of the user's hand. The finger support 86 projects laterally from the handle 18 to further define the thumb sleeve 26. Thereby, the finger support 86 is configured to be positioned between the thumb and the remaining plurality of fingers. According to the exemplary embodiment, an outer surface 88 of the finger support 86 has a generally S-shaped profile and extends from the distal end portion 76 to the proximal end portion 74 for being gripped by the plurality of fingers comfortably during use. However, it will be appreciated that the finger support 76 may be alternatively shaped for being gripped by the plurality of remaining fingers.

While the ergonomic holder 10 may be held entirely by hand, the user may also rest one or more portions of the ergonomic holder 10 on a support surface, such as a desk or table. To do so comfortably and effectively, the ergonomic holder 10 also includes a rear support member 90 projecting from the handle 18 and away from the base 20. According to the exemplary embodiment, the rear support member 90 has a support end 92 projecting toward the proximal end portion 74. Thereby, the support end 92 is configured to align with a bottom end 94 of the base 20 such that the bottom end 94 and the support end 92 define a distal pedestal 96 for supporting the remainder of the ergonomic holder 10 and the tablet computer 12 on the desk or table (See FIG. 9A).

The rear support member 90 also includes a bumper 98 on which to rest the ergonomic holder 10 on the desk or table while being gripped by hand. The bumper 98 is configured to inhibit damaging the rear support member 90 and the desk or table. As such, the bumper 98 is generally softer and/or more resilient than the remainder of the rear support member 90. For example, the bumper 98 is an elastomeric bumper 98 and further inhibits the ergonomic holder 10 from sliding on the desk or table when engaged therewith during use.

Figure 8:
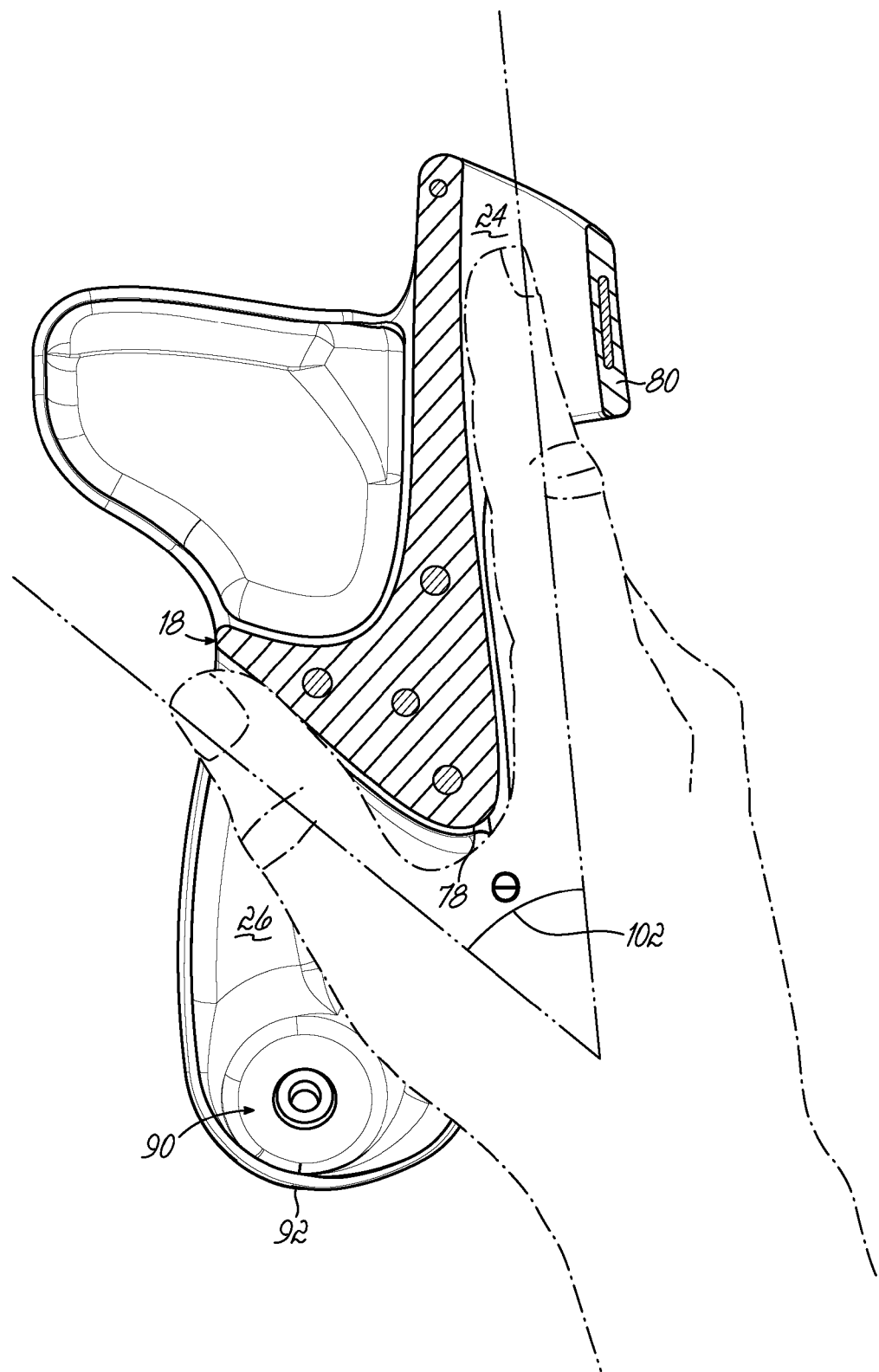
FIG. 8 is a cross-sectional view of the ergonomic holder taken along section line 8-8 of FIG. 6.

With respect to FIG. 8, the forefinger sleeve 24 and the thumb sleeve 26 intersect to define the predetermined gripping angle $\theta$ therebetween, also indicated by reference numeral 102. According to the exemplary embodiment, the predetermined gripping angle $\theta$ is between 80 degrees and 10 degrees. More particularly, the predetermined gripping angle $\theta$ is between 60 degrees and 30 degrees. According to the exemplary embodiment, the predetermined gripping angle $\theta$ is approximately 45 degrees as determined experimentally to encourage user comfort while providing enough of a moment arm about the wrist to ergonomically support the tablet computer 12.

In use, the user provides the tablet computer 12 and inserts the corner 52 of the tablet computer 12 into the groove 34 as shown in FIGS. 1-3 and FIGS. 6-8. The user then rotates the band 32 to align with the corner 50 and resiliently wraps the grip end portion 45 of the band 32 around the corner 50 to capture the tablet computer 12 with groove 34 and removably secure the tablet computer 12 to the frame 16. The forefinger and thumb of one hand are each inserted respectively into the forefinger sleeve 24 and the thumb sleeve 26. In addition, the forefinger is similarly received within the ring 82 to capture the forefinger therein. Thereby, the forefinger and the thumb are positioned at the predetermined gripping angle $\theta$ as shown in FIG. 8 for simultaneously and ergonomically supporting the tablet computer 12 thereon.

Furthermore, the remaining plurality of fingers also wrap around the handle 18 and engage the outer surface 88 of the finger support 86. According to the exemplary embodiment, the hand brace 84 is positioned against the hand and engages the portion of the hand proximal from the thumb. As such, the remaining plurality of fingers and the portion of the hand proximally positioned from the thumb also simultaneously support the tablet computer 12. Thereby, the user may rotate the hand about the wrist, move side-to-side, or generally any other plurality of positions during use and grip the handle 18 while comfortably supporting the ergonomic holder 10 and tablet computer 12.

With the hand removed from the ergonomic holder 10, the support end 92 of the rear support member 90 and the bottom end 94 of the base 20 may rest on a desk or table surface 100 in the form of the distal pedestal 96 as shown in FIG. 9A and FIG. 9B. The frame 16 and, in turn, the tablet computer 12 secured therein, may be adjusted to the selectable viewing angle. With respect to FIG. 9A, the user loosens the latch 54 and pivots the frame 16 rearward to a rearward viewing angle. Once selected, the user tightens the latch 54 to affix the frame 16 in the rearward viewing angle. In contrast, the frame 16 may be selectively pivoted to an upright viewing angle, as shown in FIG. 9B, a forward viewing angle (not shown), or any other desirable angle between the rearward and forward viewing angles for easily viewing the tablet computer 12. While the exemplary embodiment shown in FIG. 9A and FIG. 9B displays the tablet computer 12 from the distal pedestal 96 for viewing the tablet computer 12 generally vertically, it will be appreciated that another portion of the ergonomic holder 10 may be configured as a lateral pedestal (not shown) for viewing the tablet computer 12 generally horizontally.

With respect to FIGS. 1-9B, the ergonomic holder 10 includes many surfaces contoured for the user's thumb and fingers of one hand in order to position the hand comfortably while securely supporting the ergonomic holder 10. For example, when the ergonomic holder 10 is held in an upright position the ergonomic holder 10 tends to be primarily supported by a webbing between the thumb and forefinger as well as a side of the thumb. Additional support may be provided by the outer surface 88 of the finger support 86. However, the outer surface 88 of the finger support 86 also provides a comfortable position for receiving one or more of the remaining plurality of fingers, such as a middle finger. When the ergonomic holder 10 is held such that the tablet computer 12 is facing upward, as it would be if the user were holding it in a sitting down position and looking downward at the tablet computer 12, the ergonomic holder 10 is supported by the forefinger, the thumb, and the proximal end portion 74 of the ergonomic holder 10 resting on the hand and the wrist. In contrast, in the event that the ergonomic holder 10 is held with the tablet computer 12 facing downward, as would be the case if the user were reading in bed, for example, the ergonomic holder 10 would primarily be supported by the forefinger and the thumb. In addition, the wrist strap 69 may further secure the ergonomic holder 10 to the user.

To this end, the thumb sleeve 26 and the forefinger sleeve 24 provide comfortable surfaces for the forefinger and thumb to be held against while securing the ergonomic holder 10 in the user's hand. It will be appreciated that the thumb sleeve 26 and forefinger sleeve 24 may alternatively be more or less elongated, larger or smaller, and the relative angle therebetween may be altered and still provide support of the tablet computer 12 thereon. In addition, the forefinger and thumb sleeves 24, 26 may further include cushioning, such as neoprene, for enhanced user comfort.

While the present invention has been illustrated by the description of one or more embodiments thereof, and while the embodiments have been described in considerable detail, they are not intended to restrict or in any way limit the scope of the appended claims to such detail. By way of example, it will be appreciated that the ergonomic holder 10 may be configured for use with a right hand, a left hand, or any size of hand. Similarly, the ergonomic holder 10 may be configured to receive a tablet computer of any size and/or style and any changes to accommodate these sizes will be appreciated by one of ordinary skill in the art based on the description herein. To this end, it will be appreciated that the ergonomic holder 10 may be configured to receive any device or apparatus thereon and the term "tablet computer" is not intended to limit the invention described herein.

The various features shown and described herein may be used alone or in any combination. For example, the handle 18 the forefinger brace 80, the hand brace 84, the finger support 86, and the rear support member 90 are all unitarily formed together by a single body, such as a single molded body. However, according to one or more alternative embodiments, the handle 18 the forefinger brace 80, the hand brace 84, the finger support 86, and the rear support member 90 may be formed separately for assembly alone or in combination. Additional advantages and modifications will readily appear to those skilled in the art. The invention in its broader aspects is therefore not limited to the specific details, representative apparatus and method and illustrative examples shown and described. Accordingly, departures may be from such details without departing from the scope of the general inventive concept.

What is claimed is:

1. An ergonomic holder for handheld support of a tablet computer, comprising:
   a base configured to operatively connect to the tablet computer for supporting the tablet computer thereon;
   a handle projecting from said base, said handle at least partially defining a forefinger sleeve and at least partially defining a thumb sleeve configured to receive a forefinger and a thumb of a hand, respectively, said forefinger sleeve projecting relative to said thumb sleeve such that said forefinger sleeve and said thumb sleeve intersect at a predetermined gripping angle for ergonomically supporting the tablet computer in a plurality of hand positions; and
   a finger support projecting from said handle and further defining said thumb sleeve, said finger support configured to receive a remaining plurality of fingers of the hand thereon such that the remaining plurality of fingers and the forefinger and the thumb simultaneously grip the finger support and the handle, respectively, for further ergonomically supporting the tablet computer in the plurality of hand positions.

2. An ergonomic holder for handheld support of a tablet computer, comprising:
   a base configured to operatively connect to the tablet computer for supporting the tablet computer thereon;
   a handle projecting from said base, said handle at least partially defining a forefinger sleeve and at least partially defining a thumb sleeve configured to receive a forefinger and a thumb of a hand, respectively, said forefinger sleeve projecting relative to said thumb sleeve such that said forefinger sleeve and said thumb sleeve intersect at a predetermined gripping angle for ergonomically supporting the tablet computer in a plurality of hand positions; and
   a hand brace projecting from said base proximate to said forefinger sleeve and configured to engage another portion of the hand to further ergonomically support the tablet computer in the plurality of hand positions.

3. An ergonomic holder for handheld support of a tablet computer, comprising:
   a base configured to operatively connect to the tablet computer for supporting the tablet computer thereon;
   a handle projecting from said base, said handle at least partially defining a forefinger sleeve and at least partially defining a thumb sleeve configured to receive a forefinger and a thumb of a hand, respectively, said forefinger sleeve projecting relative to said thumb sleeve such that said forefinger sleeve and said thumb sleeve intersect at a predetermined gripping angle for ergonomically supporting the tablet computer in a plurality of hand positions; and
   a forefinger brace projecting from said handle such that said handle and said forefinger brace surround said forefinger sleeve to define a ring, and said ring is configured to receive the forefinger to further ergonomically support the tablet computer in the plurality of hand positions.

4. The ergonomic holder of claim 3, wherein said handle has a distal end portion and a proximal end portion, and further comprises:
a hand brace projecting from said base proximate to said forefinger sleeve and configured to engage another portion of the hand to further ergonomically support the tablet computer in the plurality of hand positions; and
wherein said hand brace is further positioned adjacent to said proximal end portion of said handle, and said forefinger brace is positioned adjacent to said distal end portion of said handle opposite said hand brace.

5. An ergonomic holder for handheld support of a tablet computer, comprising:
a base configured to operatively connect to the tablet computer for supporting the tablet computer thereon;
a handle projecting from said base, said handle at least partially defining a forefinger sleeve and at least partially defining a thumb sleeve configured to receive a forefinger and a thumb of a hand, respectively, said forefinger sleeve projecting relative to said thumb sleeve such that said forefinger sleeve and said thumb sleeve intersect at a predetermined gripping angle for ergonomically supporting the tablet computer in a plurality of hand positions; and
a rear support member projecting from said handle and away from said base such that said rear support member at least partially defines a first pedestal configured to support the tablet computer in a first position on a surface.

6. An ergonomic holder for handheld support of a tablet computer, comprising:
a base configured to operatively connect to the tablet computer for supporting the tablet computer thereon;
a handle projecting from said base, said handle at least partially defining a forefinger sleeve and at least partially defining a thumb sleeve configured to receive a forefinger and a thumb of a hand, respectively, said forefinger sleeve projecting relative to said thumb sleeve such that said forefinger sleeve and said thumb sleeve intersect at a predetermined gripping angle for ergonomically supporting the tablet computer in a plurality of hand positions; and
a rear support member projecting from said handle and including an elastomeric bumper for resting the rear support member on a surface.

7. The ergonomic holder of claim 1, further comprising:
a frame configured to receive the tablet computer, said frame connected to said base.

8. The ergonomic holder of claim 7, wherein said frame is pivotably connected to said base and configured to selectively pivot relative to said handle for moving the tablet computer to a selectable viewing angle.

9. The ergonomic holder of claim 7, further comprising:
a band connected to at least one of said frame, said base, and said handle and configured to removably secure the tablet computer to said frame.

10. An ergonomic holder for handheld support of a tablet computer, comprising:
a base configured to operatively connect to the tablet computer for supporting the tablet computer thereon;
a handle projecting from said base, said handle at least partially defining a forefinger sleeve and at least partially defining a thumb sleeve configured to receive a forefinger and a thumb of a hand, respectively, said forefinger sleeve projecting relative to said thumb sleeve such that said forefinger sleeve and said thumb sleeve intersect at a predetermined gripping angle for ergonomically supporting the tablet computer in a plurality of hand positions;
a frame configured to receive the tablet computer, said frame connected to said base; and
a resilient band pivotably connected to said frame and configured to removably secure the tablet computer to said frame.

11. The ergonomic holder of claim 7, further comprising a clip projecting from at least one of said frame, said base, and said handle and configured to removably receive a writing utensil therein for use with the tablet computer.

12. The ergonomic holder of claim 11, further comprising a writing utensil removably received within said clip.

13. The ergonomic holder of claim 1, wherein said predetermined gripping angle is less than 90 degrees.

14. The ergonomic holder of claim 13, wherein said predetermined gripping angle is between 80 degrees and 10 degrees.

15. The ergonomic holder of claim 14, wherein said predetermined gripping angle is approximately 45 degrees.

16. A method of supporting a tablet computer by a hand with an ergonomic holder, the ergonomic holder including a base and a handle, the base configured to operatively connect to the tablet computer for supporting the tablet computer thereon, and the handle projecting from the base, the handle at least partially defining a forefinger sleeve and at least partially defining a thumb sleeve, the forefinger sleeve projecting relative to the thumb sleeve such that the forefinger sleeve and the thumb sleeve intersect at a predetermined gripping angle, wherein the ergonomic holder includes a finger support projecting from the handle and further defining the thumb sleeve, and the method comprises:
positioning a forefinger relative to a thumb at the predetermined gripping angle such that the forefinger and the thumb define a generally "L" shape, wherein the forefinger is inserted within the forefinger sleeve of the handle and the thumb is inserted within the thumb sleeve of the handle to support the ergonomic holder and the tablet computer via the forefinger and the thumb; and
positioning the finger support between a remaining plurality of fingers and the thumb to support the ergonomic holder and the tablet computer via the forefinger, the thumb, and the remaining plurality of fingers.

17. The method of claim 16, wherein the ergonomic holder includes a hand brace projecting from a proximal end portion of the ergonomic holder, and the method further comprises:
positioning the hand brace against a portion of the hand proximally positioned from the thumb to support the ergonomic holder and the tablet computer on the forefinger, the thumb, and the portion of the hand.

18. The method of claim 16, wherein the ergonomic holder includes a forefinger brace projecting from the handle such that the handle and the forefinger brace surround the forefinger sleeve to define a ring, and the method further comprises:
capturing at least a portion of the forefinger within the ring such that the portion of the forefinger engages the ring in any position about the ring while supporting the ergonomic holder and the tablet computer thereon.

19. The ergonomic holder of claim 1, further comprising:
a hand brace projecting from said base proximate to said forefinger sleeve and configured to engage another portion of the hand to further ergonomically support the tablet computer in the plurality of hand positions.

20. The ergonomic holder of claim 1, further comprising:
a forefinger brace projecting from said handle such that said handle and said forefinger brace surround said forefinger sleeve to define a ring, and said ring is configured to receive the forefinger to further ergonomically support the tablet computer in the plurality of hand positions.

21. The ergonomic holder of claim 1, wherein said handle has a distal end portion and a proximal end portion, and further comprises:
a hand brace projecting from said base proximate to said forefinger sleeve and configured to engage another portion of the hand to further ergonomically support the tablet computer in the plurality of hand positions; and
a forefinger brace projecting from said handle such that said handle and said forefinger brace surround said forefinger sleeve to define a ring, and said ring is configured to receive the forefinger to further ergonomically support the tablet computer in the plurality of hand positions,
wherein said hand brace is further positioned adjacent to said proximal end portion of said handle, and said forefinger brace is positioned adjacent to said distal end portion of said handle opposite said hand brace.

22. The ergonomic holder of claim 1, further comprising:
a rear support member projecting from said handle and away from said base such that said rear support member at least partially defines a first pedestal configured to support the tablet computer in a first position on a surface.

23. The ergonomic holder of claim 1, further comprising:
a rear support member projecting from said handle and including an elastomeric bumper for resting the rear support member on a surface.

24. The ergonomic holder of claim 9, wherein said band is a resilient band pivotably connected to said frame.

* * * * *